United States Patent [19]

Cole

[11] Patent Number: 5,675,903

[45] Date of Patent: Oct. 14, 1997

[54] ALIGNMENT MECHANISM FOR JOINTERS

[76] Inventor: Jerry W. Cole, 8 Dolge Ct., Charlton, Mass. 01507

[21] Appl. No.: 662,924

[22] Filed: Jun. 13, 1996

[51] Int. Cl.$^6$ ................................................. B27G 23/00
[52] U.S. Cl. .......................... 33/635; 33/201; 33/633; 144/114.1; 144/117.1
[58] Field of Search ........................... 144/2.1, 114.1, 144/116, 117.1, 130, 218; 33/201, 628, 630, 633, 634, 635, 640, 641, 700

[56] References Cited

U.S. PATENT DOCUMENTS

| | | | |
|---|---|---|---|
| 3,206,860 | 9/1965 | Warrick | 33/633 |
| 3,903,609 | 9/1975 | Brown | 33/635 |
| 4,694,582 | 9/1987 | Walston, Jr. | 33/635 |
| 4,854,051 | 8/1989 | Hessenthaler | 33/628 |
| 4,893,662 | 1/1990 | Gervasi | 144/117.1 |
| 5,020,228 | 6/1991 | Hessenthaler | 33/201 |

*Primary Examiner*—W. Donald Bray
*Attorney, Agent, or Firm*—Blodgett & Blodgett, P.C.

[57] ABSTRACT

The alignment mechanism includes a main body, a clamp which is connected to the main body for clamping the main body to the frame of a jointer and for creating a tension on the rotor of the jointer against rotation of the rotor about its drive axis. The clamping elements also include rotor adjusting elements connected to the main body for applying torque to the rotor to overcome the clamping tension on the rotor. The alignment mechanism also includes a reference member connected to the main body to provide a reference surface for aligning the cutting blades of the rotor to the top dead center position.

13 Claims, 3 Drawing Sheets

ALIGNMENT MECHANISM FOR JOINTERS

BACKGROUND OF THE INVENTION

The present invention is directed to a device for aligning the cutting blades in a jointer. A jointer is a power tool which is used in cabinet making for planing or grading a surface of a piece of wood so that the surface is perfectly flat. When the piece of wood is joined by gluing to a planed surface of another piece of wood, a perfect seam is formed. The jointer is also used for many other woodworking applications, requiring the use of straight pieces of wood with uniformly flat surfaces.

A typical woodworking jointer includes a frame, an infeed table which has a horizontal top surface, and an outfeed table which has a horizontal top surface. The infeed table ends in a first horizontal end edge which is transverse to the line of feed of the workpiece. The outfeed table has a second edge which is transverse to the line of feed of the workpiece and spaced from the first end edge to define a gap with the first end edge. A rotor is mounted on the frame beneath the gap for rotation about a horizontal drive axis which is parallel to the gap. The rotor is rotated by an electric motor through conventional drive means such as a belt and sheaves. A plurality of cutting blades are adjustably mounted in the rotor for movement toward and away from the gap. The cutting blades are maintained in an adjusted position by set screws. Each cutting blade has a cutting edge which is parallel to the gap.

The infeed table is adjustably mounted on the frame for adjusting the height of its top surface relative to the top surface of the outfeed table. The cutting edge of each blade is set so that it is at the same level as the top surface of the outfeed table at its uppermost or "top dead center" position. The difference between the upper surfaces of the infeed table and the outfeed table represents the amount of wood which is planed from the workpiece when the workpiece is fed from the infeed table to the outfeed table. The precut portion of the workpiece lies flat on the infeed table and the finished portion of the workpiece lies flat on the outfeed table as the workpiece is pushed across the gap from the infeed table to the outfeed table. This insures full control of the workpiece and results in a uniformly flat cut or planed surface in the workpiece.

The quality of the planer surface of the workpiece depends on the accuracy of the adjusted positions of the cutting blades relative to the upper surface of the outfeed table. The cutting edge of each cutting blade must be parallel to the upper surface of the outfeed table. The cutting edge of each cutting blade must also be at the same level as the upper surface of the outfeed table at its uppermost of "top dead center" position during the rotation of the rotor. Just as importantly, the cutting edges of the cutting blades must be uniformly positioned with respect to each other. If all of the above conditions are not adhered to, it will have a negative effect on the quality of the finished workpiece.

Although most modern jointers are capable, in theory, of producing substantially perfect cuts in workpieces, this goal is seldom achieved. It is difficult to adjust the position of each cutting blade so that its cutting edge is perfectly level with the upper surface of the outfeed table at its "top dead center" with any degree of consistency. The operator must position the cutting blade relative to the rotor while trying to maintain the cutting blade at what the operator believes to be the "top dead center" position. This procedure be repeated for the other cutting blades. It is difficult to hold the rotor at a desired position while adjusting the cutting blades. Even if the operator is close to the "top dead center" position during each adjustment, it is essentially impossible to adjust all of the blades at the same position. These and other difficulties experienced with blade adjustment for jointers have been obviated in a novel manner by the present invention.

It is, therefore, a principal object of the present invention to provide an alignment mechanism for jointers which greatly facilitates the adjustment of the cutting blades of a jointer and enables uniform and accurate adjustments to be made.

Another object of this invention is the provision of an alignment device for a jointer which provides a reference surface for the "top dead center" position for each cutting blade to enable each blade to be accurately adjusted to the "top dead center" position and consistent with the adjusted position of the cutting blades.

A further object of this invention is the provision of an alignment device for a jointer which holds the rotor in a set position and which enables the rotor to be adjustably rotated in a precise controlled manner while firmly holding the rotor in position to adjust the cutting blade to the "top dead center" position in a precise manner and to maintain the cutting blade at that position while the blade is adjusted relative to the rotor.

With these and other objects in view, as will be apparent to those skilled in the art, invention resides in the combination of parts set forth in the specification and covered by the claims appended hereto.

SUMMARY OF THE INVENTION

In general, the invention consists of an alignment mechanism for a jointer which includes a main body, clamping means for clamping the main body to the frame of the jointer and for creating a tension on the rotor of the jointer against rotation of the rotor about its drive axis, and a rotor adjusting means operatively connected to the main body for applying torque to the rotor which is sufficient to overcome the tension against rotation which is created by the clamping means. The invention also consists of a reference member which is mounted to the main body and which has a horizontal reference edge surface. Adjustment means are operatively connected to the main body for adjusting the position of the reference member relative to the upper surface of the outfeed table to position the reference edge surface in vertical alignment with the drive axis of the rotor.

BRIEF DESCRIPTION OF THE DRAWINGS

The character of the invention, however, may be best understood by reference to one of its structural forms, as illustrated by the accompanying drawings, and which.

DESCRIPTION OF THE PREFERRED EMBODIMENT

Figure 1:
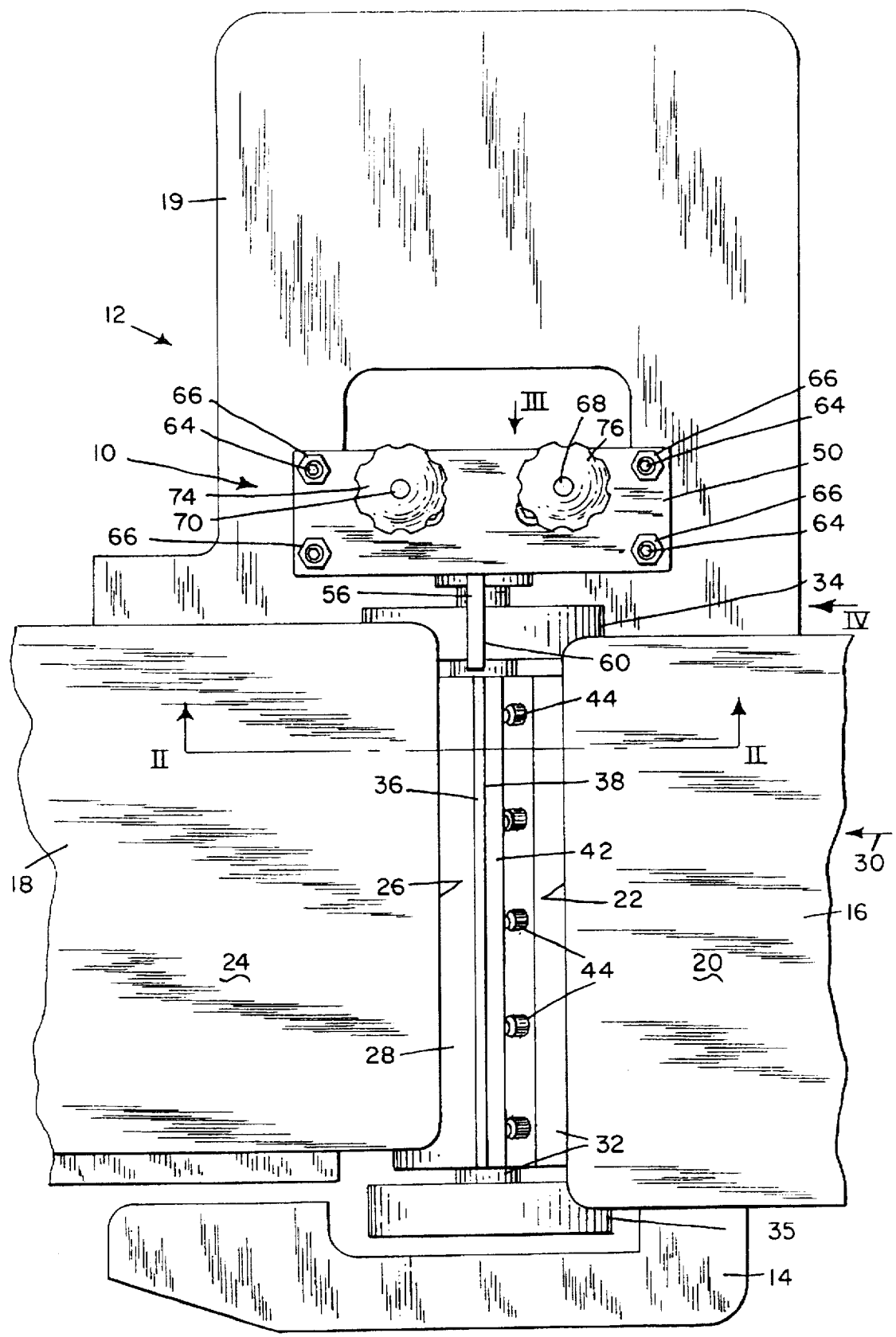
FIG. 1 is a plan view of the alignment mechanism, embodying the principals of the present invention.

Referring to the drawings, the alignment mechanism of the present invention is generally indicated by the reference numeral 10 and is shown in the drawings applied to a conventional woodworking jointer, generally indicated by the reference numeral 12. The jointer 12 is a woodworking machine used in cabinet making for planing the surfaces of boards.

Figure 2:
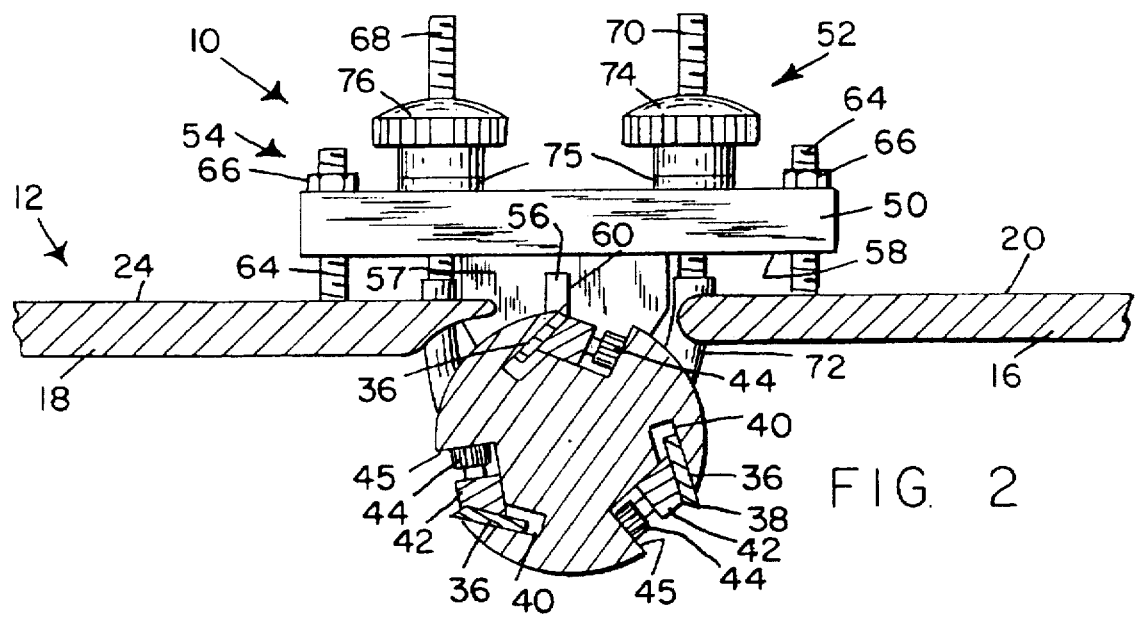
FIG. 2 is a vertical cross-sectional view of the alignment mechanism taken along the line II—II of FIG. 1 and looking in the direction of the arrows.
Figure 4:
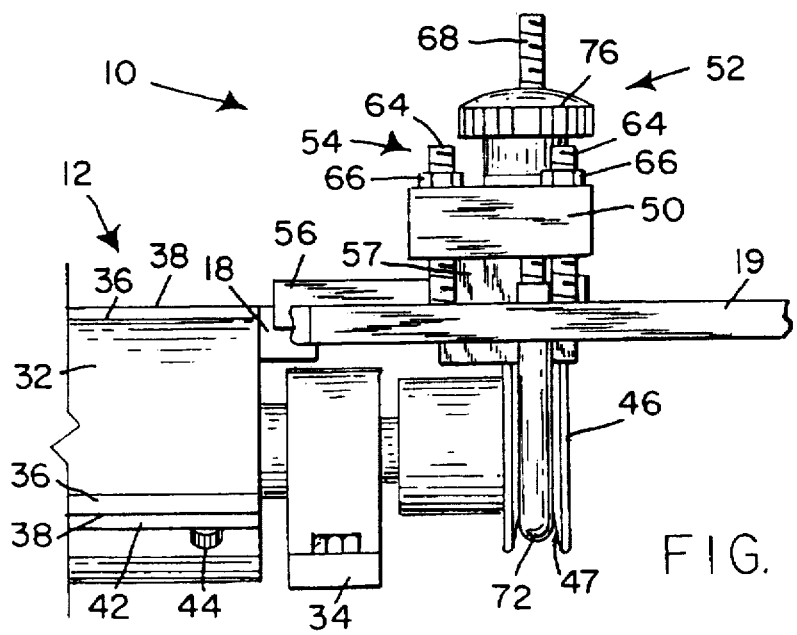
FIG. 4 is an elevational view of the alignment mechanism, looking in the direction of arrow IV of FIG. 1.

The jointer 12 comprises a frame 14, an infeed table 16, an outfeed table 18 and a support table 19 which is fixed to the frame. The infeed table 16 has a horizontal upper surface 20 and an end edge 22 which extends laterally to the line of feed for a workpiece, the line of feed being generally indicated by the arrow 30. The outfeed table 18 has an upper horizontal surface 24 and an end edge 26 which is spaced from and parallel to the end edge 22 to define, with the end edge 22, a gap 28. A rotor 32 is mounted in bearings 34 and 35 for rotation about a horizontal drive axis which is parallel to the end edges 26 and 22 and located below the gap 28. Referring particularly to FIG. 4, one end of the rotor 32 is fixed to a sheave 46 which is operatively connected to an electric drive motor, not shown, via a drive belt, not shown. Referring particularly to FIG. 2, the rotor 32 supports a plurality of cutting blades 36. Each cutting blade 36 is located in an over-size slot 40 of the rotor and has a cutting edge 38 which extends beyond the periphery of the rotor. Each cutting blade 36 is held in place by a horizontal bar 42 and a plurality of screws 44. Each screw 44 is threaded into the bar 42 and the head of the screw bears against a surface 45 which faces the cutting blade 36. As the screw is backed off, the head of the screw bears against the surface 45 and forces the bar 42 against the cutting blade 36 to clamp it in place. Each cutting blade 36 is adjusted by advancing the screws 44 into the bar 42 thereby releasing the tension on the cutting blade. This allows the cutting blade 36 to be moved within the groove 40 toward and away from the gap 28. Ideally, each cutting blade 36 is adjusted so that the cutting edge 38 is at the same level as the surface 24 of the outfeed table 18 and parallel with the surface 24 when the cutting edge 38 is at its uppermost or "dead center" position during the rotation of the rotor 32 about its drive axis. The infeed table 16 is adjustably mounted on the frame 14 for vertical movement relative to the outfeed table 18. During operation of the jointer, the infeed table 16 is vertically positioned so that the upper surface 20 is below the surface 24 of the outfeed table 18. The difference in height between the surfaces 20 and 24 represents the thickness of the material which is to be cut from the workpiece which is advanced from the infeed table 20 across the gap 28 to the surface 24 of the outfeed table 18. Therefore, it is important that each cutting blade 36 be adjusted so that the cutting edge 38 is level with the surface 24 at its uppermost or "dead center" position and that each cutting blade 36 is adjusted relative to the surface 24 to the same extent as the remaining cutting blades. With the cutting blades so adjusted, the jointer is capable of producing smooth, accurate and reliable planing of the workpiece which is advanced through the jointer along the line of travel 30. However, in actual practice, the accurate and uniform positioning of the cutting blades is rarely accomplished. It is difficult to accurately establish the "dead center" position for each cutting blade. Even when the "dead center" position is determined for the cutting blade, it is difficult to maintain the rotor in that position while the cutting blade is being adjusted to maintain two criteria, i.e. height and levelness of the cutting edge 38. Also, this procedure must be repeated consistently for each of the other cutting blades.

The alignment mechanism 10 of the present invention comprises a generally rectangular main body 50, clamping means, generally indicated by the reference numeral 52, and leveling means, generally indicated by the reference numeral 54. The body 50 has a lower horizontal reference edge 58. A bracket 57 extends downwardly from the surface 58 and fixedly supports a reference member 56. The reference member 56 has a vertical reference surface 60, which has a lower reference edge 62. The reference surface 60 is tangent to the reference surface 58 of the main body 50. The reference member 56 is located substantially centrally of a v-shaped lower surface 59 of the bracket 57.

The leveling means 54 comprises a plurality of adjusting screws 64 which are threaded into the main body 50 adjacent the four corners of the main body as illustrated in FIG. 1. Each adjusting screw 64 is held in its adjusted position by means of a locking nut 66.

The clamping means 52 comprises a pair of threaded rods 68 and 70 which extend freely through apertures 67 in the body 50 so that the lower ends of the rods extend below the lower horizontal reference surface 58 of the main body 50. The lower end of each of the threaded rods 68 and 70 is fixed to the opposite ends of an elongated flexible connector 72. The connector 72 in the preferred embodiment of the invention is a plastic coated cable. A pair of adjusting nuts 74 and 76 are threaded onto the upper ends of the rod 70 and 68, respectively. The adjusting nuts 74 and 76 are preferably made of a material having a low coefficiency of friction, such as plastic and large enough to be turned by hand. It is also preferred that a plastic washer 75 be located between each of the adjusting nuts and the upper surface of the body 50. This enables the nuts 74 and 76 to rotate relative to the washers 75 with minimum friction.

Figure 3:
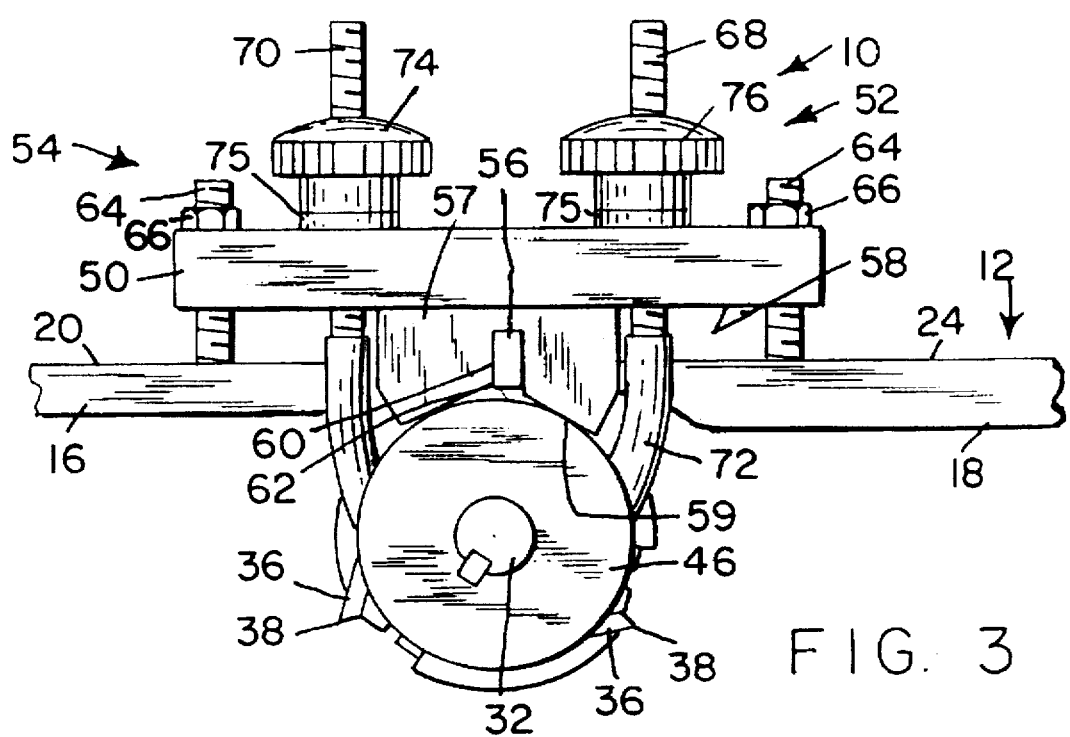
FIG. 3 is an elevational view of the alignment mechanism, looking in the direction of arrow III of FIG. 1.

The alignment mechanism 10 is applied to the jointer 12 by positioning the main body portion 50 on the support table 19 as shown in FIG. 1, so that the lower ends of the adjusting screws 64 engage the upper surface of the supporting table 19 as shown in FIGS. 2–4. The locking nuts 66 are loosened and each screw 64 is adjusted so that the lower reference surface 58 of the main body 50 is parallel with the upper surface of the outfeed table 18. During the initial setup of the alignment mechanism, it is desirable to adjust the position of the infeed table 16 so that the surface 20 of the infeed table is level with the surface 24 of the outfeed table 18. This will provide an additional reference point for leveling the lower surface 58 of the main body portion 50. When the alignment mechanism 10 is positioned on the support table 19, the flexible connector 72 is positioned within the groove 47 of the sheave 46 as shown in FIG. 4, so that it engages the lower portion of the groove. When the flexible connector 72 is so positioned, the lower v-shaped surface 59 of the bracket 57 engages the upper end of the sheave 46 as shown in FIG. 3. The adjusting nuts 74 and 76 are both tightened to draw the rods 70 and 68, respectively, upwardly through the body 50 which clamps the sheave 46 between the flexible connector 72 and the bracket 57. This provides a clamping tension against the sheave 46 and prevents the rotor 32 from turning about its drive axis except by applying a predetermined torque to the rotor 32.

The positioning of the reference member 56 relative to the main body 50 is such that when the horizontal reference surface 58 of the main body is level with the surface 24 of the outfeed table, the reference surface 60 is vertically aligned with the drive axis of the rotor 32. This enables the surface 60 to function as a reference surface for determining the vertical plane of the drive axis of the rotor to assist the operator in locating the cutting edge 38 of the cutting blade 36 at the "dead center" position for adjusting each of the cutting blades 36. When the alignment mechanism 10 is properly positioned, the reference member 56 extends toward the gap 28 as shown in FIG. 1. When the cutting edge 38 is aligned with the vertical surface 60 as shown in FIG. 1, the cutting edge 38 is in its uppermost, or top "dead center" position. This can be confirmed by placing a flat bar, such as a carpenter's square, on the surface 20 of the infeed table 16 so that it extends into the gap 20 and engages the reference surface 60. If it also engages the cutting edge 38, then the cutting edge is at its top "dead center" position. If the cutting edge 38 is not aligned with the reference surface 60, it is brought into alignment by manipulating the adjusting nuts 74 and 76. As viewed in FIG. 2, the rotor 32 is rotated in a clockwise direction by loosening the nut 74 and tightening the nut 76. This causes the rod 68 to move upwardly and the rod 70 to move downwardly, which, in turn, causes the connector 72 to rotate clockwise about the drive axis of the rotor and to rotate the sheave 46, due to its frictional engagement with the sheave. The rotor 32 is rotated in the counter-clockwise direction by loosening the nut 76 and tightening the nut 74 which causes the rod 70 to be raised vertically and the rod 78 to be pulled down vertically. The resultant counter-clockwise movement of the flexible connector 72 causes the sheave 46 to rotate counter-clockwise due to the tight frictional engagement of the connector 72 within the groove 47 of the sheave.

Referring to FIG. 1, if the cutting edge 38 is to the left of the reference surface 60, clockwise adjustment of the rotor 32, as viewed in FIG. 2, will position the cutting edge 38 in line with the reference surface 60 as viewed in FIG. 1. If the cutting edge 38 is to the right of the reference surface 60, as viewed in FIG. 1, then, counter-clockwise rotation of the rotor 32 by the manipulation of the adjusting nuts 74 and 76 will cause the cutting edge 38 to move to the left as viewed in FIG. 1 until it is aligned with the reference surface 60. The threaded rods 68 and 70 and adjusting nuts 76 and 74 represent actuating means for adjustably positioning the cutting edge 38 to the top "dead center" position in a controlled, precise manner. The actuating means represented by these elements provides very minute movements of the rotor to provide precise positioning of the cutting blade while firmly maintaining the rotor in its clamped adjusted position. Once the cutting blade is positioned at its top "dead center" position, the blade can be adjusted relative to the rotor in a conventional manner. When the cutting blade 36 has been adjusted, then, the adjusting nuts 74 and 76 are both loosened and the rotor is rotated to bring the next curing blade to its approximate top "dead center" position. The adjusting nuts 74 and 76 are then both tightened and the adjusting procedure described above is repeated.

The alignment device 10 of the present invention is also useful for adjusting the cutting blades in situations where the sheave, which is attached to the rotor, is of inferior quality, or damaged, so that when the bracket 57 is positioned on top of the sheave, the reference surface 60 may not be vertically aligned with the drive axis of the rotor due to imperfections in the sheave. In such a case, the reference member 56 is not utilized, but the clamping and actuating features of the alignment mechanism are utilized once the top "dead center" position has been determined by other alignment means. For example, a straight bar can be extended across the gap 28 and the angular position of the rotor 32 adjusted by the manipulation of the adjusting screws 74 and 76 as described above so that the cutting edge 38 reaches its highest point, as viewed in FIG. 2, to indicate its top "dead center" position. Since the alignment mechanism 10 of the present invention will maintain the rotor firmly in any desired position, the cutting blade 36 can be adjusted relative to the rotor in the usual manner.

It is contemplated that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by letters patent is:

1. An alignment mechanism for a jointer having a line of feed for a workpiece, said jointer having a frame; an infeed table which has a horizontal surface and a horizontal first end edge which is transverse to said line of feed; an outfeed table which has a horizontal upper surface and a horizontal second end edge which is transverse to said line of feed and spaced from said first end edge to define with said outer edge a cutting gap; a horizontal rotor which is mounted on said frame for rotation about a horizontal drive axis which is vertically aligned with said gap; and at least one cutting blade which is adjustably mounted on said rotor for adjustably positioning said horizontal cutting edge toward and away form said gap, said alignment mechanism comprising:

(a) a main body;

(b) clamping means for clamping said main body to the said frame of the jointer adjacent one end of the cutting gap and to the rotor of the jointer for maintaining said body in a fixed position relative to said frame and the horizontal drive axis of the rotor and for creating a tension on said rotor against rotation of said rotor about said drive axis for enabling said rotor to rotate about said drive axis upon the application of a torque to said rotor which is sufficient to overcome said tension;

(c) a reference member which is mounted to said main body and which extends toward said gap when said alignment device is applied to said jointer, said reference member having a reference edge; and (d) leveling means operatively connected to said main body for adjusting the position of said reference member relative to the horizontal surface of said outfeed table to position said reference edge in vertical alignment with said horizontal driving axis.

2. An alignment mechanism as recited in claim 1, wherein said reference member is fixed relative to said main body and said leveling adjustment means comprises at least one adjusting screw which is threaded into said body for vertical movement relative to said body, said adjusting screw extending below said main body for engaging said frame and for adjustably changing the position of said main body and the reference member relative to the frame.

3. An alignment mechanism as recited in claim 2, wherein there are four spaced adjusting screws which are disposed on said main body so that when said alignment mechanism is mounted on said jointer, there are two of said adjusting screws on each side of said horizontal drive axis.

4. An alignment mechanism as recited in claim 2, wherein said main body has a horizontal reference surface and said reference member has a vertical reference surface which intersects said reference edge and which is tangent to said horizontal reference surface so that when said horizontal reference surface is parallel to the upper surface of said outfeed table when said alignment mechanism is mounted on said jointer, said vertical reference surface is in a vertical plane which intersects said drive axis.

5. An alignment mechanism as recited in claim 1, wherein said jointer has a drive sheave which is fixed to said rotor, said drive sheave having an annular groove for receiving a drive belt, and wherein said clamping means comprises:

(a) a downwardly facing surface on said main body for engaging the upper portion of said drive sheave;

(b) an elongated flexible engager for frictionally engaging the lower portion of said drive sheave; and (c) actuating means operatively connected to said main body and said flexible engager for drawing said flexible engager toward said main body for clamping said drive sheave against said downwardly facing surface.

6. An alignment mechanism as recited in claim 5, wherein said actuating means includes rotor adjusting means for rotating said rotor while maintaining tension on said rotor, said actuating means comprising:

(a) a first threaded rod which is fixed to a first end of said flexible engager and which extends freely through and above said main body;

(b) a second threaded rod which is fixed to a second end of said flexible engager and which extends freely through and above said main body;

(c) a first adjusting nut which is threaded on said first threaded rod and in engagement with said main body so that rotation of said first nut causes said first threaded rod to move axially relative to said main body; and (d) a second adjusting nut which is threaded on said second threaded rod and in rotary sliding engagement with said main body so that rotation of said second adjusting nut causes said second threaded rod to move axially relative to said main body wherein loosening of said first nut while tightening of said second nut causes said rotor to rotate in a first direction and wherein loosening of said second nut while tightening said first nut causes said rotor to rotate in a second direction.

7. An alignment mechanism as recited in claim 6, wherein said first and second adjusting nuts are made of a material which has a substantially low coefficiency of friction.

8. An alignment mechanism as recited in claim 5, wherein said downwardly facing surface engages said drive sheave at a first point at a first side of said drive axis and engages said drive sheave at a second point at a second side of said drive axis.

9. An alignment mechanism for a jointer having a line of feed for a workpiece, said jointer having a frame; an infeed table which has a horizontal surface and a horizontal first end edge which is transverse to said line of feed, an outfeed table which has a horizontal upper surface and a horizontal second end edge which is transverse to said line of feed and spaced from said first end edge to define with said outer edge a cutting gap; a horizontal rotor which is mounted on said frame for rotation about a horizontal drive axis which is vertically aligned with said gap; and at least one cutting blade which is adjustably mounted on said rotor for adjustably positioning said horizontal cutting edge toward and away form said gap, said alignment mechanism comprising:

(a) a main body;

(b) clamping means for clamping said maid body to the frame of the jointer adjacent one end of the cutting gap and to the rotor of the jointer for maintaining said body in a fixed position relative to the frame and the horizontal drive axis of the jointer and for creating a tension on said rotor against rotation of said rotor about said drive axis for enabling said rotor to rotate about said drive axis upon the application of a torque to said rotor which is sufficient to overcome said tension; and (c) rotor adjusting means operatively connected to said main body for applying a torque to said rotor which is sufficient to overcome said tension and adjustably rotate said rotor.

10. An alignment mechanism as recited in claim 9, wherein said jointer has a drive sheave which is fixed to said rotor, said drive sheave having an annular groove for receiving a drive belt, and wherein said clamping means comprises:

(a) a downwardly facing surface on said main body for engaging the upper portion of said drive sheave;

(b) an elongated flexible connector for frictionally engaging the lower portion of said drive sheave; and (c) actuating means operatively connected to said main body and said flexible connector for drawing said flexible connector toward said main body for clamping said drive sheave against said downwardly facing surface.

11. an alignment mechanism as recited in claim 10, wherein said actuating means includes said rotor adjusting means, said actuating means comprising:

(a) a first threaded rod which is fixed to a first end of said flexible connector and which extends freely through and above said main body;

(b) a second threaded rod which is fixed to a second end of said flexible connector and which extends freely through and above said main body;

(c) a first adjusting nut which is threaded on said first threaded rod and in engagement with said main body so that rotation of said first nut causes said first threaded rod to move axially relative to said main body; and (d) a second nut which is threaded on said second threaded rod and in rotary sliding engagement with said main body so that rotation of said second adjusting nut causes said second threaded rod to move axially relative to said main body wherein loosening of said first adjusting nut while tightening of said second adjusting nut causes said flexible connector and said drive sheave to rotate in a first direction about said drive axis, thereby causing said rotor to rotate in said first direction and wherein loosening of said second adjusting nut while tightening said first adjusting nut causes said flexible connector and said drive sheave to rotate in a second direction about said drive axis, thereby causing said rotor to rotate in said second direction.

12. An alignment mechanism as recited in claim 11, wherein said first and second adjusting nuts are made of a material which has a substantially low coefficiency of friction, and are inefficiently large to be rotated by hand.

13. An alignment mechanism as recited in claim 10, wherein said downwardly facing surface engages said drive sheave at a first point at a first side of said drive axis and engages said drive sheave at a second point at a second side of said drive axis.

* * * * *